FIG. 6
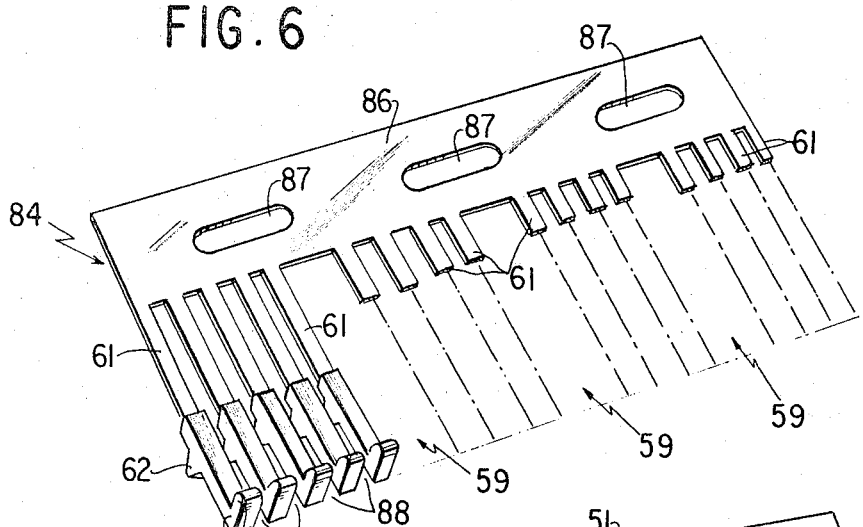
FIG. 7
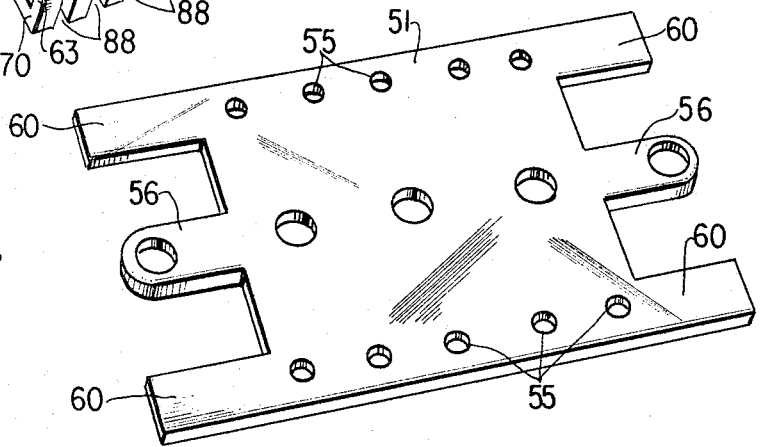
FIG. 8
INVENTOR
MICHAEL GRUNDFEST
BY
Robertson, Smyth & Bryan
ATTORNEYS July 11, 1967 M. GRUNDFEST 3,330,917
ROTARY DRUM PROGRAMMING APPARATUS
Filed Jan. 18, 1965 6 Sheets-Sheet 4

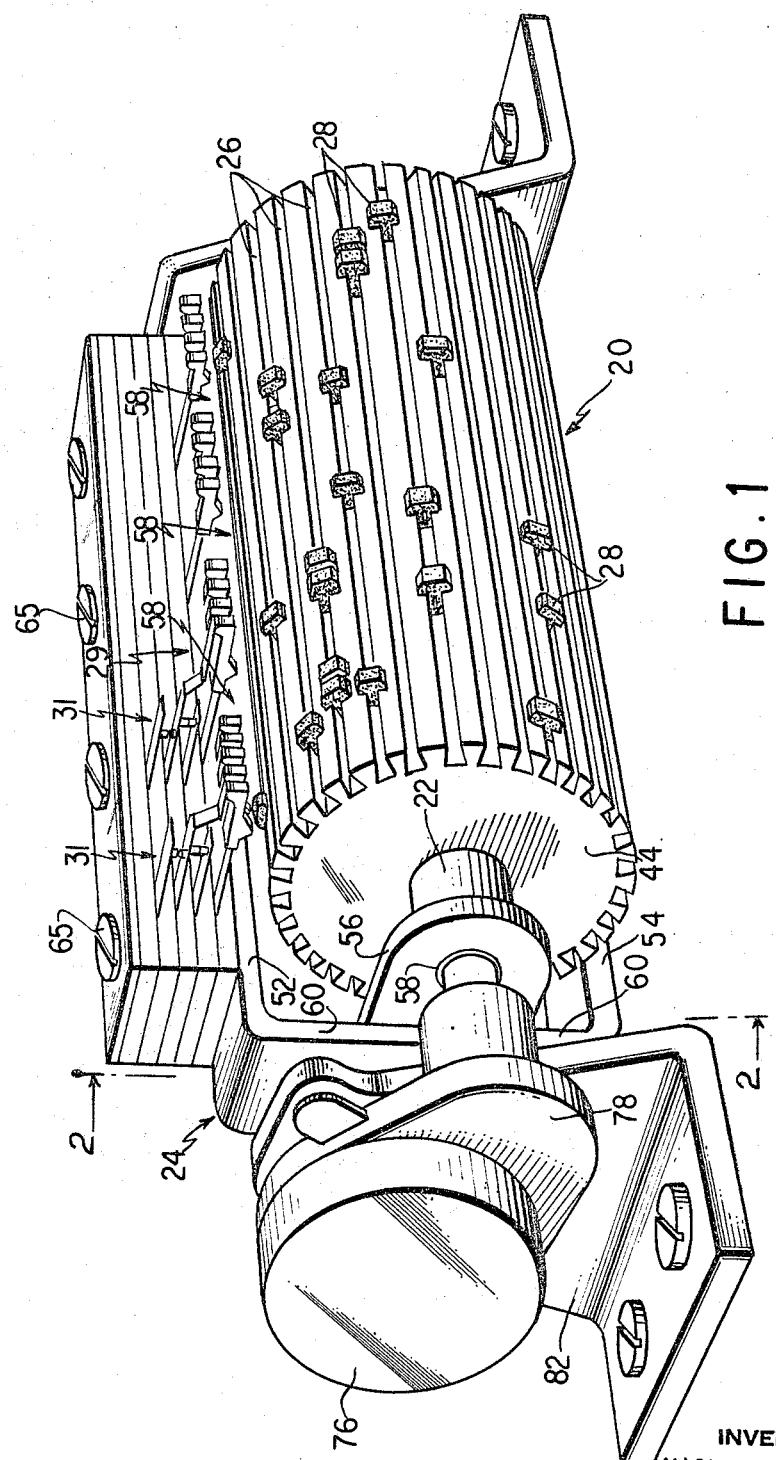

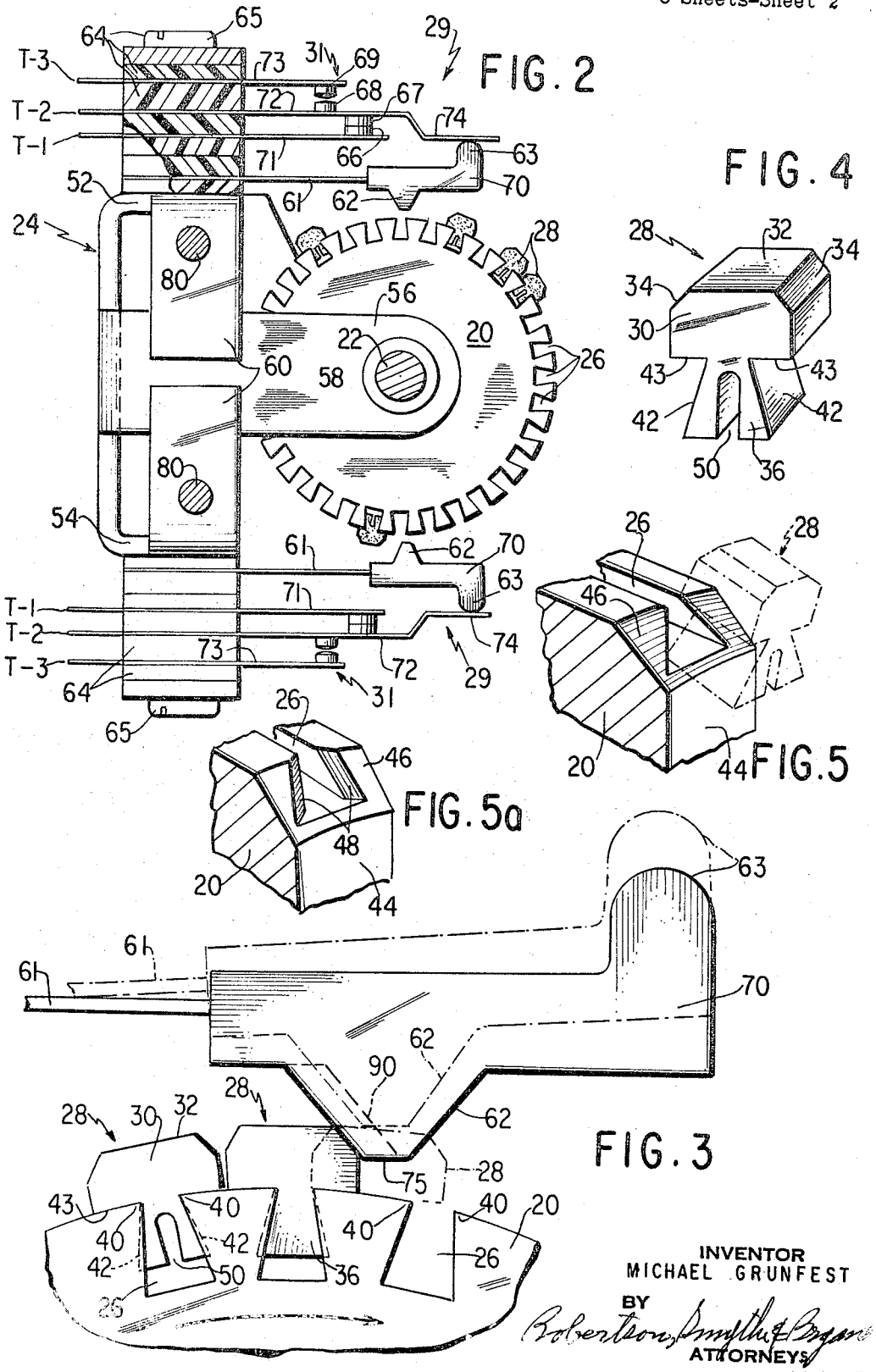

INVENTOR
MICHAEL GRUNDFEST
BY
Robertson, Smythe & Bryan
ATTORNEYS

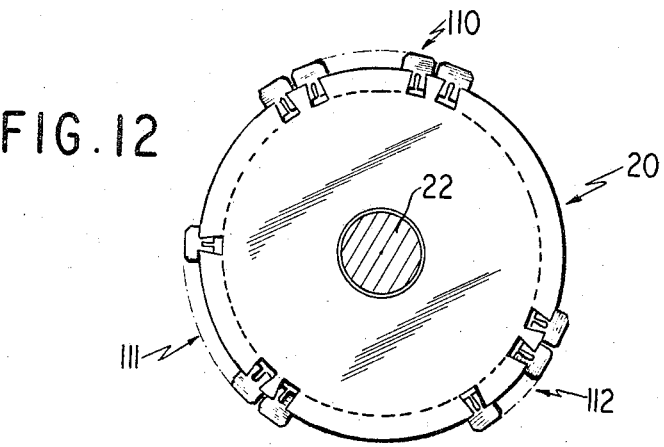
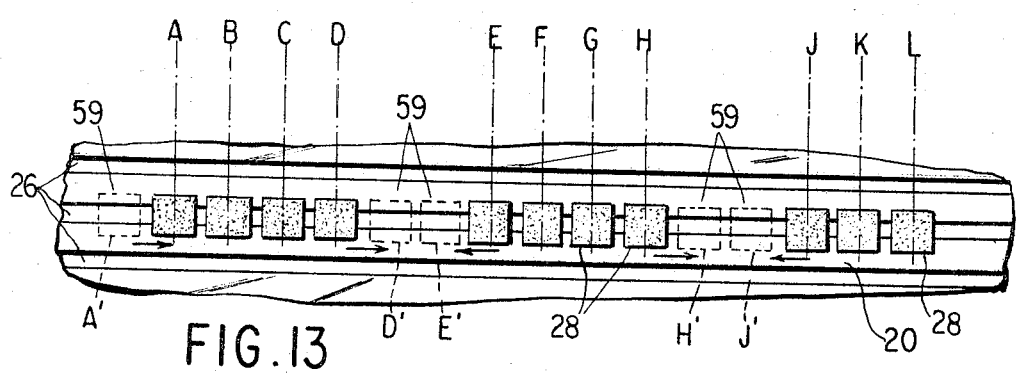
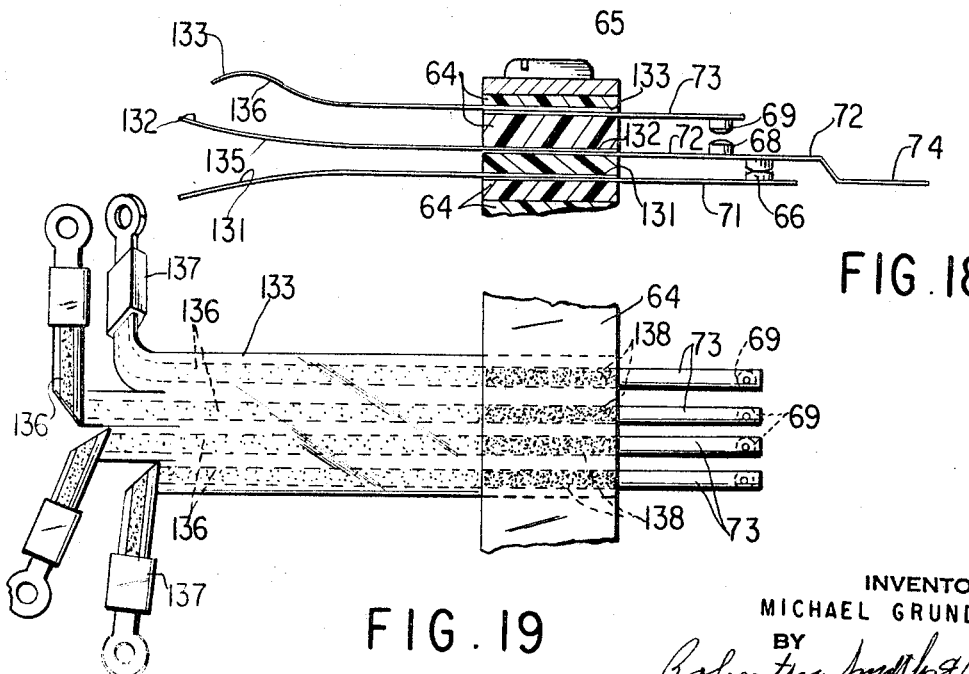

United States Patent Office 3,330,917
Patented July 11, 1967

3,330,917
ROTARY DRUM PROGRAMMING APPARATUS
Michael Grundfest, Rego Park, N.Y., assignor to Sealectro Corporation, Mamaroneck, N.Y.
Filed Jan. 18, 1965, Ser. No. 426,054
14 Claims. (Cl. 200—38)

This invention relates to programming apparatus and more particularly to improved rotary drum programming apparatus suitable for use in controlling electrical equipment, machinery, processes, and the like and adapted for providing the functions of timing, sequencing, actuating and switching.

In rotary drum type switches prior to the present invention complex drum and cam structures have been used. In many cases the prior switch devices have been bulky and expensive and only a limited number of programs were available. Often the program was permanently built into the device or so arranged that the user was required to disassemble the drum structure and to replace the cam parts with other parts of different shape so as to change the program. The cumulative effects of manufacturing tolerance in the complex and numerous parts introduced multiple tolerance variations in these prior devices so that inaccuracies in control operation resulted.

It is an object of the present invention to provide rotary drum programming apparatus which is simple in construction and yet which provides a structure capable of great flexibility in selecting and setting up programs and convenient for quickly re-programming whenever desired.

It is another object of the present invention to provide rotary drum programming apparatus having the advantages of wide flexibility in selecting and changing programs, convenience in use and wherein the control operation is dependable, precise and reliably predictable in use in spite of abrupt changes in environmental conditions, such as temperature and humidity.

In the illustrative embodiments of the present invention described herein the rotatable drum has a plurality of parallel undercut channels formed in its periphery. A plurality of actuators are frictionally anchored by interference fit in these channels so that the actuators are firmly held by elastic deformation of the engaging parts and yet they can be slid along the lengths of the channels by strong pressure by an operator's thumbnail for quickly and conveniently setting up various programs without disassembling the drum apparatus. The angular position of each actuator about the center of the drum is always precisely determined regardless of its longitudinal position. The drum with the actuators anchored in the undercut channels is adapted to operate a plurality of control members which are positioned adjacent to the drum at positions spaced along the length of the drum.

The various actuators can be shifted along their channels into active positions or into inactive parking positions. By positioning two or more actuators in successive adjacent channels so that they are in circumferential alignment about the periphery of the drum, the user can quickly and easily construct program cams of various effective length without disassembling the drum apparatus. Moreover, in each case the effective circumferential length of the cam and its angular position about the drum are precisely predictable from the number of actuators which are utilized to construct it. Also, this same cam can easily be constructed at another angular or longitudinal position on the drum or on another similar drum. Thus, the user is assured that any desired program sequence can be precisely repeated quickly and conveniently at other positions or in other apparatus as often as required.

In the illustrative embodiments of the present invention as described, the control members which are positioned adjacent to the drum are formed as a unitary structure so that the position of each control member with respect to its actuator is precisely controlled to produce a reliably predictable timing sequence.

Other aspects, features and advantages of the present invention will be more fully understood from a consideration of the following description in conjunction with the accompanying drawings, in which:

FIGURE 1 is a perspective view of rotary drum programming apparatus embodying the present invention and shown on enlarged scale;

FIGURE 2 is an end elevational sectional view of a modified embodiment of the invention, being a view corresponding to one taken generally along the line 2–2 of FIGURE 1;

FIGURE 3 is an enlarged illustration of a portion of the drum, actuators and control members of FIGURES 1 and 2;

FIGURE 4 is an enlarged perspective view of one of the actuator elements;

FIGURE 5 is an enlarged view showing the insertion of one of the actuator elements into the end of one of the undercut channels on the drum;

FIGURE 5a shows a modified end of the channel;

FIGURE 6 is a perspective view showing the integral structure of the spring arm control members with their integrally molded cam follower end portions;

FIGURE 7 is a perspective view of the integral frame blank, and FIGURE 8 shows the formation of the frame from this blank;

FIGURE 12 illustrates the effectively continuous cam which is provided by a plurality of actuators in adjacent slots and circumferentially aligned on the drum;

FIGURE 13 shows the way in which the various actuators can be shifted along the drum into storage or parking areas in which they are inactive;

FIGURES 18 and 19 are a plan and sectional view of integrated cabling connections to various switch members.

Figure 9:
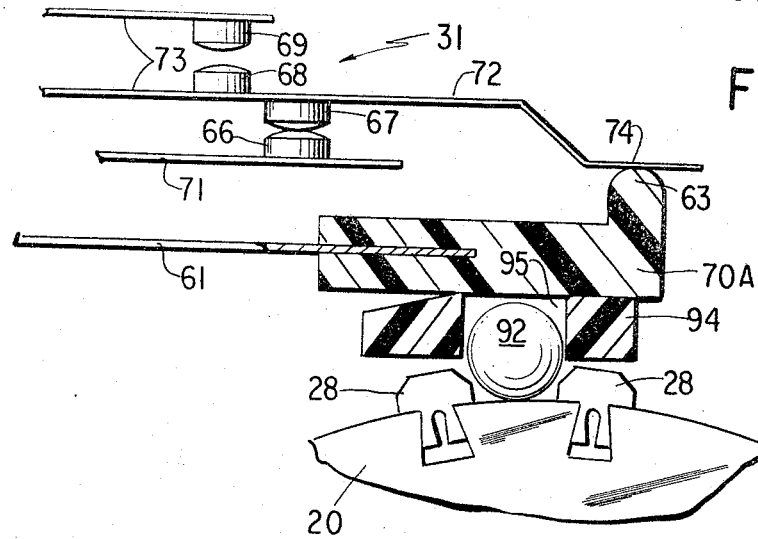
FIGURE 9 shows another embodiment including a ball follower to reduce friction.

In the illustrative embodiment of the present invention shown in FIGURE 1 a drum 20 is secured to a rotatable shaft 22 mounted upon a rigid frame 24. This drum is a unitary structure with a plurality of identical, parallel undercut channels 26 of keystone configuration extending longitudinally and uniformly spaced in its periphery. Actuator elements 28, as shown enlarged in FIGURE 4, are anchored in the undercut channels with spaces between them so that they are adapted to be slid along the lengths of these channels into different operating or storage positions for setting up various control programs, as will be explained in detail further below. When the program apparatus is in use, the drum 20 is turned into different angular positions by rotating the shaft 22, and the actuators 28 serve to engage and move selected control member 29 (FIG. 1) so as to operate various switches 31. By changing the positions of the individual actuators a vast number of different switching control programs is produced, as desirable for controlling electrical equipment, machinery, processes, and the like for producing timed sequences and operations.

Each actuator 28 (FIG. 4) includes a head 30 having a flattened top area 32 with rounded leading and trailing corners 34 and has a leg portion 36 which flares downwardly and outwardly from the head to define an outline of keystone shape providing a press fit engagement in any desired one of the channels 26. As will be described in detail further below the actuator head 30 may be formed with modified configurations to provide various on-off time intervals and sequences. At the waist 38 or juncture between the head 30 and leg portion 36, the width of the actuator is equal to the spacing between the opposed rims 40 at the top of each channel 26. Thus, each actuator is held precisely positioned on the drum by the opposed pairs of rims 40 which straddle this waist 38.

In order to anchor the actuator at any desired position longitudinally of the channel by a firm frictional engagement, the side surfaces 42 of the foot portion 36 diverge at a slightly greater angle than the side walls of the channel 26 below the rims 40. This additional divergence of the side surfaces of the foot portion is indicated in FIGURE 3 by the dotted outline 42, and thus is provides an interference fit of progressively greater tightness at progressively greater depths in the channel.

By virtue of this arrangement the elastic deformation of the leg portion 36 occurs at a distance below the waist 38 and below the opposed rims 40. Thus, these rims 40 provide precise orientation and location on the drum, and the waist 38 retains its initial size so as to provide the precise circumferential location of each actuator on the drum. Moreover, the resilient pressure of the outwardly sloping surfaces 42 pulls the shoulder surfaces 43 of the head 30 down into a snug contact flush against the periphery of the drum to provide precise radial location of the top surface 32 of each actuator with respect to the periphery of the drum.

As shown in FIGURE 5, the leg portions of the individual actuators are inserted into the ends of the channels 26, and the actuators are then slid longitudinally along the channels to form the desired control pattern on the drum. To facilitate the insertion of the actuators, the periphery of the drum adjacent to its end 44 is beveled as shown at 46 in FIGURE 5 to a radial depth below that of the channels 26. For added convenience, the channel walls at their ends may be angled out to form a funnel entrance 48, as indicated at FIGURE 5a, but this is not a necessity. In these illustrative examples, the leg portion 36 is shown as having a deep vertical slot 50 dividing it into a pair of resilient legs. This deep slot 50 provides added compliance in the leg portion which I have found to be desirable for most applications; however, where there is sufficient compliance in the leg portion 36, then this slot 50 may be omitted, as is shown in FIGURE 3. In these illustrative embodiments the drum 20 is formed of aluminum with the channels 26 being precisely formed therein at uniformly spaced intervals around its periphery and the actuator elements 28 are formed of acetal resin.

In order to provide precise positioning of the control members 29 with respect to the periphery of the drum 20, the frame 24 is formed from a unitary blank 51, as shown in FIGURES 7 and 8. The longitudinal edges of this blank are bent out into a U-shape to provide a top and a bottom support ledge 52 and 54 having attachment openings 55 for securing the switch means 31 and control members 29 thereon. The ends of this blank each have an E shape, with the projecting center elements 56 being bent up to provide brackets for mounting the axially aligned bearings 58 (FIGS. 1 and 2). The projecting outer end elements 60 are bent to provide braces overlapping the bearing brackets 56.

As a result of this construction there is a rigid unitary frame extending from the bearings 58 to the switch support ledges 52 and 54. This unitary frame structure eliminates tolerance accumulation such as occurs in the prior art structures in which switch frames are built up from multiple pieces.

As shown in FIGURES 1 and 2 the control members 29 comprise switching sets 31, each set being positioned in a plane perpendicular to the axis of the drum 20 so that each set occupies only a small fraction of the length of the drum. These control members 29 are arranged in groups; for example, FIGURE 1 illustrates three groups of four sets and a fourth group of five sets, with intervening parking or storage spaces 59. The convenience usage of these parking spaces 59 will be explained in detail in connection with FIGURE 13.

Each set of the control members 29 includes a resilient switch actuating arm 61 having a molded end section 70 providing a cam follower lobe 62 of V-shaped contour with a flattened tip 75 and a switch pusher button 63. The resilient arm 61 is formed as a leaf spring having its base end clamped in position between insulating spacer strips 64 secured to the support ledge 52 or to the ledge 54, as the case may be, by means of machine screws 65. The illustrative switch means 31 comprise a single pole double throw arrangement having a pair of normally closed contacts 66 and 67 and normally open contacts 68 and 69 mounted upon respective arms 71, 72 and 73. It will be understood that this particular switch arrangement is illustrative only and that various other switch contact arrangements and ganged contacts may be used as may be desirable for a wide variety of different control and sequencing applications. These switch arms 71, 72 and 73 are conductive leaf springs which are clamped in position between additional insulating strips 64, and the projecting back ends of these arms form the respective switch terminals T-1, T-2, and T-3 to which control circuit connections are made.

For operating the switch, the center arm 72 has an extension 74 which is bent down and out into engagement with the pusher button 63. When the drum 20 is turned into an angular position such that the cam follower lobe 62 rides up as shown in FIGURE 3 onto the head portion 30 of one of the actuators 28, then the actuating arm 61 is deflected upwardly, thus lifting the center switch arm 72 to open the contacts 66 and 67 and to close the contacts 68 and 69.

In the embodiment of FIGURE 1 the control members 29 are mounted only upon the upper support ledge 52. Consequently the control pattern may extend for a full 360° around the drum and it may advantageously include one or more on-off switching cycles per revolution of the drum for each switch set, depending upon the positioning of the various actuators 28. In FIGURE 2 the control members 29 are mounted upon both of the support ledges 52 and 54 so that the cam follower lobes 62 are located on diametrically opposite sides of the drum. With this arrangement various control patterns may be used which extend for a full 360° around the drum or two different programs extending for 180° each, and so forth. Regardless of the particular program on the drum, the actuation of the lower control members is displaced 180° of a revolution from the corresponding actuation of the upper ones.

The drum 20 may be turned in any suitable manner, either step-by-step or continuously, as may be desired. In some installations the drum is turned manually by a control knob on the shaft 22; however, in many installations an electrically energized drive means 76 is utilized as illustrated in FIGURE 1. This drive means 76 is an electric motor, rotary stepping solenoid, or the like and has a drive connection to the end of the shaft 22 within the housing 78. When the frame 24 is installed it may conveniently be secured to an instrument panel by machine screws 80 (FIG. 2) passing through the end braces 60. Alternatively, as shown in FIGURE 1, mounting brackets 82 may be secured to the end braces 60.

In order to position the various cam follower lobes 62 and switch push buttons 63 in precise alignment one with another and with the periphery of the drum so that the actuation of each switch set is accurately predeterminable by placement of the actuators 28, the switch actuating arms 61 are formed from a unitary sheet blank 84 of spring stock. Thus, the individual arms 61 are all parallel and are held in this relationship by a common base portion 86 having mounting openings 87. Moreover, the cam follower lobes 62 are formed by simultaneously molding all of the end sections 70 onto the ends of the individual flexible leaf spring arms 61. These end sections 70 are individually molded with separating spaces 88 by a unitary precision mold, said sections 70 being formed of tough, rigid plastic such as acetal resin. These insulating end sections 70 also serve to insulate the flexible metal arms 61 from the switch arms 72.

Among the many advantages of this integral structure are those resulting from the fact that various precise time differentials and timing sequences can readily be custom made by milling away selected portions of the lobes 62. For example, as shown in FIGURE 3 the sloping surface of the lobe 62 may be cut away as indicated by the dotted line 90. Hence, when the drum is turned in the direction of the arrow, the particular switch being controlled by this cam follower surface 90 will be actuated at a predetermined angular increment subsequent to the actuation of another switch 31 by one of the standard size lobes 62.

In the embodiment of FIGURE 9 a ball follower 92 is provided for reducing the actuating torque. This ball follower 92 is made of hardened metal and is held in position by a retaining plate 94 having apertures 95 and extending parallel to the axis of the drum beneath the end sections 70A of the resilient arms 61. This retainer 94 is formed of a suitable rigid structural material, for example, such as rigid plastic as shown or metal, and it is secured to the support ledge 52 or 54, as the case may be. It is to be noted that the insulating end sections 70A differ from the end sections 70 in that their lower surfaces are flat, adjacent to the retainer plate 94. When one of the actuators 28 is moved under the ball 92, it cams the ball upwardly in the aperture 95 so as to deflect the arm 61 upwardly for operating the switch means 31.

Figure 10:
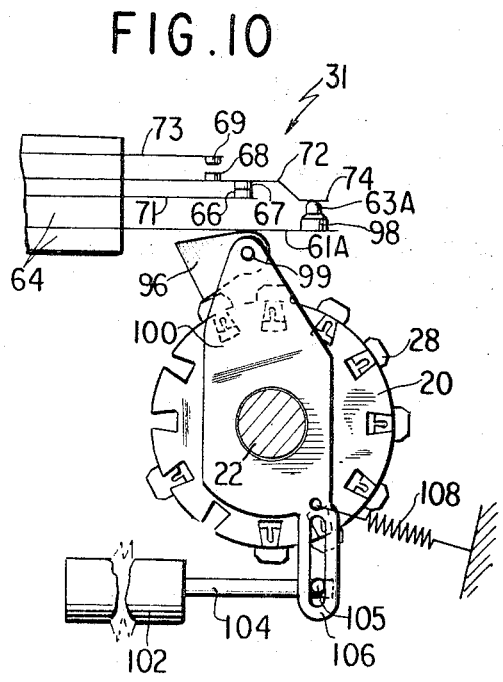
FIGURES 10 and 11 are views generally similar to FIGURE 2 and showing a further embodiment.
Figure 11:
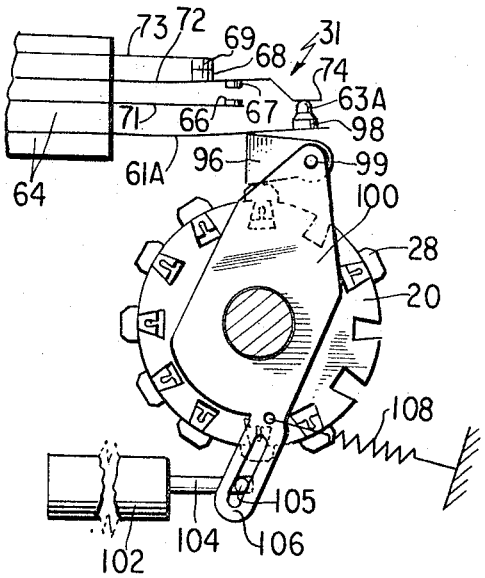
Figure 16:
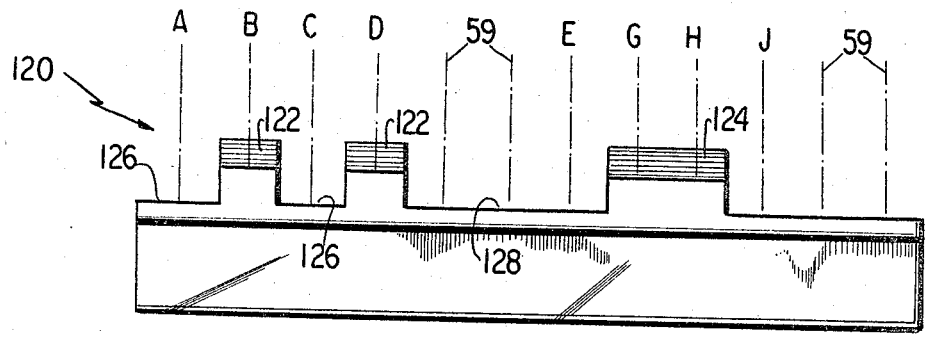
FIGURES 14, 15, 16 and 17 illustrate modified actuator elements.
Figure 17:
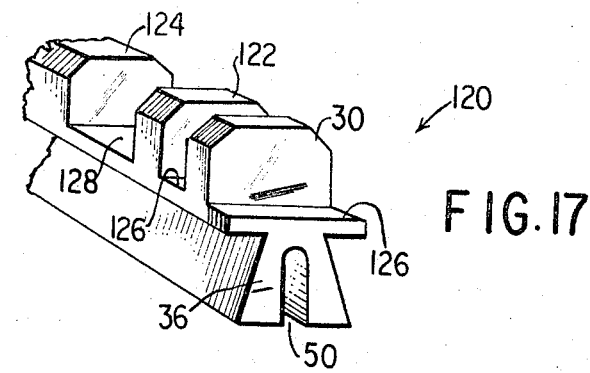

FIGURES 10 and 11 illustrate a further embodiment of the invention wherein a selector cam follower 96 is interposed between the actuators 28 and the resilient arm 61A. This arm 61A is similar to the actuating arm 61, except that it has an insulating pusher bottom 63A mounted in a socket 98 at its end. The selector cam follower 96 is wedge-shaped, and at its narrower end it has a pivot connection 99 to a selector lever 100 which can be swung about the drum shaft 22.

When the selector lever 100 is in its rear position as shown in FIGURE 10, then the movable cam 96 is retracted into inactive relationship with respect to the actuators 28 and actuating arm 61A. Because of this inactive relationship the program drum can be turned from any initial position through one or more intervening positions to any second position without affecting any of switch sets 31 during passage of the drum through the intervening positions.

As soon as the desired second position is reached, then as shown in FIGURE 11, the lever 100 is swung forward so as to interpose the wider end of the selector cam in its active position between the actuating arm 61A and the periphery of the drum. If there is one of the actuator elements 28 at the switching location, then the selector cam 96 rides up onto this actuator 28 so as to deflect the arm 61A, thus operating the switch.

In summary concerning the movable selector cam 96, it enables the selection of different programs by turning the drum through intervening switching positions without affecting any of the switches during the change from one program to another. The lever 100 may be moved manually if desired; however, as shown there is an electrically energized driver 102, such as a solenoid, having an operating rod 104 coupled by a pivot 105 to a projecting end 106 of the lever 100. Spring bias means 108 urge the selector lever 100 toward its inactive position, and it is swung to its active position whenever the drive means 102 is energized.

FIGURE 12 illustrates the effectively continuous cams of various sizes, such as those at 110, 111, and 112 which are conveniently provided by positioning various numbers of actuators 28 in successive adjacent channels in circumferential alignment about the priphery of the drum. Although there is a slight space between adjacent actuators, the flattened tip 75 (FIG. 3) of the cam follower lobe 62 effectively bridges across so as to maintain the actuating arm 61 in its deflected position when the drum is being turned from one end to the other of such a cam 110, 111, or 112. It will be appreciated that even though each of these cams is built up from several adjacent actuators, nevertheless there is no cumulation of tolerance variations because the angular spacing between the first and last actuator in the cam is precisely determined by their firm engagement in the respective drum channels 26, as explained above for each individual actuator.

FIGURE 13 shows how conveniently the control programs on the drum can be set up and changed by sliding the individual actuators along the channels 26 into the parking spaces 59. A portion of the drum 20 is shown in plan view, and one of the channels 26 has groupings of the actuators 28 whose positions are individually designated by letters for purposes of explanation. Thus, for example, in the group of four actuators A, B, C, and D the end actuators may be shifted longitudinally of the channel into alternate parking positions A' and D'. Similarly, the individual actuators E and H may be moved over to the parking positions E' and H', and so forth. Although actuators are illustrated in the positions F and G, they may be omitted; or, if present, they may be shifted into the now vacant positions E and H, etc. At any time, the actuators may be removed from or inserted into the ends of the channels 26 as indicated in FIGURE 5. Thus, it will be appreciated that vast numbers of different control programs can be set up quickly and conveniently and can be changed and revised whenever required, without disassembly of the apparatus. The various actuators may be color coded for aiding the operator to set up any predetermined programs as he may desire.

Figures 14, 15:
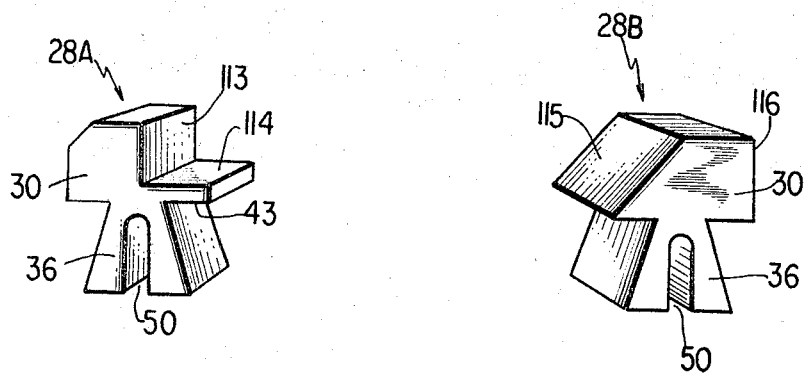

In order to provide additional sequences of on/off time intervals, the actuator head 30 may have various configurations as shown by the actuators 28A and 28B in FIGURES 14 and 15. For example, a step recess 113 may be formed therein so that the top surface 114 of one of the shoulders 43 is below the level for engaging any of the actuating arms 61. Also, a long sloping surface 115 may be provided for gradually camming the actuating arms upwardly. For applications in which a plurality of actuators are adjacent one to another as shown in FIGURE 12 to form a continuous cam surface, then the corner 116 (FIGURE 15) of the actuator head may be square.

In certain control applications wherein particular sequences and patterns commonly occur, a full-line actuator element 120 may conveniently be provided having a length equal to the full length of one of the channels 26. The head portion 30 is cut out at predetermined locations to a level below that which will engage the actuating arms. Thus, the time for setting up the program and for reprogramming is considerably shortened in cases when known sequences are going to be used. A library of such full-line actuators 120 is kept in storage, and, in the particular embodiment, for example, the portions 122 each correspond to an individual actuator, while the portion 124 is equivalent to two adjacent actuators for operating two control members simultaneously. The cut out regions 126 are each equivalent to the absence of one actuator, and the elongated cut out region 128 is equivalent to the absence of one actuator and two parking spaces.

In order to increase the convenience of installation and reliability of the terminal connections, an integral flat cabling ribbon conductor structure and clamped connection arrangement is provided as shown in FIGURES 18 and 19. Wide bands or sheets of flexible plastic material 131, 132 and 133 are clamped adjacent to the respective groups of conductive switch arms 71, 72 and 73. These plastic sheets overlap the base of each switch arm over the full width of the region between the mounting strips 64, as shown in FIGURE 18. Each of these plastic sheets has a plurality of flexible conductive ribbons 134, 135, and 136, respectively, bonded to its lower surface in spaced parallel relationship and aligned with the respective switch arms. Thus there is a relatively large area of contact between each switch arm 71, 72 or 73 and its corresponding conductive ribbon 134, 135, or 136. For example, FIGURE 19 shows in plan view the large contact area 138 (darkly shaded) between the base end of each switch arm 73 and the conductive ribbon 136 extending thereto. This large area of contact 138 which is under firm pressure provides a very reliable low resistance connection and it avoids any necessity for soldering operations to take place in the vicinity of the program apparatus, hence avoiding any deleterious effects. In FIGURE 19 the plastic sheet 133 is transparent and the conductive ribbons 136 can be seen therethrough forming a flat cable. Suitable connections are made to the ends of these flat conductive ribbons 134, 135 and 136 as by soldering or crimping terminal 137 thereto at a position remote from the program apparatus.

In these illustrative embodiments of the invention the channels 26 in the drum have a depth of 0.080 of an inch, and the width of the channel at the bottom is 0.060 of an inch. The width of the channel at its top between the opposed rims 40 is 0.040 of an inch. The leg portion 36 of the actuator 28 has a width at its waist 38 of 0.040 of an inch and a width at the bottom end of 0.060 of an inch, with a depth of 0.060 of an inch from the shoulder surface 43 down to the bottom end of the leg portion 36. The head portion 30 is 0.050 of an inch high and has a width of 0.090 of an inch. In these embodiments the actuator elements 28, 28A, 28B and 120 are molded of a stiff, tough, creep-resistant, and resilient plastic, for example, such as acetal resin, e.g. "Delrin," which maintains these properties under a wide range of temperature and humidity conditions. Also, these molded parts have a self-lubricating skin which aids the operator in sliding the actuators to their desired positions in spite of their tight interference fit relationship in the channel. These dimensions and the resin material are set forth specifically as exemplary because I have found that they work very well in providing the operating advantages described.

From the foregoing it will be understood that the various embodiments of the programming apparatus of the present invention as described above are well suited to provide the advantages set forth. It will be understood that many possible embodiments may be made of the various features of this invention and that the apparatus herein described may be varied in various parts, without departing from the scope of the invention, that all matter hereinbefore set forth or shown in the accompanying drawings is intended to be interpreted as illustrative and not in a limiting sense, and that, in certain instances, some of the features of the invention may be used while omitting a corresponding use of other features, all without departing from the scope of the invention, as defined by the following claims limited solely by the prior art.

What is claimed is:

1. Rotary drum programming apparatus comprising a rotatable drum having a plurality of parallel undercut keystone channels formed in its periphery, a plurality of control members positioned adjacent to the periphery of said drum at spaced points along the length of said drum, and a plurality of actuator elements each having a keystone root slidably anchored in one of said channels, said actuator elements each having a head protruding beyond the periphery of said drum for engaging selected ones of said control members upon rotation of said drum into selected positions, said actuator elements being slidable along said keystone channels into different longitudinal positions on the drum for providing different control patterns of said actuator elements.

2. Rotary drum programming apparatus comprising a rotatable drum having a plurality of parallel undercut channels formed in its periphery, said drum being a unitary structure and said channels extending longitudinally of the drum, a plurality of control members adjacent to the periphery of said drum at spaced points along the length of said drum, a plurality of actuators each having a root anchored in one of said undercut channels for preventing radial extraction of the actuators, said actuators each having a head protruding beyond the periphery of said drum for engaging selected ones of said control members upon rotation of said drum into selected positions, said actuators being frictionally anchored in position by interference fit in said channels but being slidable by manual force along said channels into different positions along the length of said drum for providing different control programs, and at least one end of each of said undercut channels being open for convenient insertion of additional actuators to change the number of actuators on the drum for providing additional control programs.

3. A rotary programming drum having a plurality of parallel undercut channels in its periphery extending longitudinally of the drum, said channels being adapted for receiving actuator elements therein slidable longitudinally of the drum, the opposite walls of said channels diverging inwardly toward the center of the drum with the regions of said channels at the periphery of the drum having a narrower width than lower regions of said channels.

4. An actuator for insertion into a channel in a rotary programming drum comprising a stiff, resilient integral element having a head portion adapted for actuation of a control member when the drum is rotated, a narrow waist and a leg portion extending downwardly from said waist, said leg portion having diverging side surfaces sloping outwardly and downwardly from said waist, said actuator being adapted to extend for a substantial length along a channel and having a plurality of head portions with at least one cut out region between said head portions, said cut out region having a level near to said waist.

5. A actuator for insertion into channels of a rotary programming drum comprising an integral element having a head portion for actuating a control member when the drum is rotated, a narrow waist and a foot portion extending downwardly from said waist, said integral element being symmetrical about an axis extending down through said head portion, waist and foot portion, the lower surfaces of said enlarged head providing a pair of shoulder surfaces extending out above the waist on opposite sides of said axis, and said foot portion having a keystone shape with a pair of outwardly and downwardly sloping flat side surfaces.

6. Rotary drum programming apparatus comprising a rotatable drum having a plurality of parallel undercut channels in its periphery extending longitudinally of the drum, the side walls of said channels diverging downwardly toward the interior of the drum, and a plurality of actuator elements each having a head portion protruding above the periphery of the drum and a leg portion of stiff, resilient material having downwardly diverging side surfaces, the leg portion of said actuators being frictionally anchored in said channels in interference fit relationship.

7. Rotary programming drum apparatus comprising a rotatable drum having a plurality of parallel undercut channels in its periphery extending longitudinally of the drum, the side walls of said channels sloping inwardly toward the interior of the drum to define a width across an inward region of said channels which is greater than the width across an outward region of said channels, and a plurality of actuators anchored in the respective channels of said drum, each of said actuators being an integral element having a head portion, a narrow waist which is narrower than said head portion and a foot portion extending inwardly from said waist, each of said integral elements being symmetrical about an axis extending inwardly through the head portion, waist and foot portion and the lower surfaces of said head portion providing pairs of shoulder surfaces on each actuator extending out above the waist on opposite sides of said axis, and said foot portions each having a pair of outwardly and downwardly sloping side surfaces engaging said side walls of the respective channels in force fit frictional engagement therewith, and the wedging action of said side surfaces and side walls holding said shoulder surfaces of said actuators flush against the periphery of the drum adjacent to said channels.

8. Rotary drum programming apparatus comprising a rotatable drum having a plurality of parallel undercut channels in its periphery extending longitudinally of the drum, the side walls of said channels diverging downwardly, a plurality of control members positioned adjacent to the periphery of said drum, said control members being arranged in groups longitudinally of the drum with spaces between said groups, and a plurality of actuator elements each having a head portion protruding above the periphery of the drum for engaging selected ones of said control members and a leg portion of stiff, resilient material having downwardly diverging side surfaces, the leg portion of each of said actuators being frictionally anchored in said channels in interference fit relationship, and said actuators being slidable along said channels into positions corresponding with said spaces for temporarily storing said actuators in inactive positions for setting up different control patterns of said actuator elements.

9. Rotary drum programming apparatus comprising switch means, a rotatable drum for operating said switch means, said drum having a plurality of parallel undercut channels in its periphery extending longitudinally of the drum, a plurality of parallel switch actuating arms positioned adjacent to said switch means and adjacent to the periphery of said drum, said switch actuating arms including parallel leaf springs integral with a common base portion with plastic end sections molded onto the free ends, said end sections each having a cam follower lobe thereon, said lobes being aligned one with another and also being aligned with the longitudinal axis of said channels, a plurality of actuator elements each having a foot portion anchored in one of said channels and a head portion protruding above the periphery of the drum for engaging a selected cam follower lobe to deflect a selected switch actuating arm, each of said foot portions being formed of stiff, resilient material frictionally anchored in one of said channels in interference fit relationship, and said actuators each being slidable along the respective channels into positions corresponding with different cam follower lobes for providing different switching programs each having a precisely predetermined actuation relationship.

10. Rotary drum programming apparatus comprising a plurality of switch means, a plurality of parallel switch actuating arms positioned adjacent to respective ones of said means for operating the respective switch means upon movement of the corresponding actuating arm, said switch actuating arms being formed by parallel leaf springs integral with a common base portion with plastic end sections molded onto the free end of said leaf springs, said end sections each having a cam follower lobe thereon, said lobes having sloping surfaces and being aligned one with another, at least one of said sloping surfaces being offset from alignment with the others, a rotatable drum for operating said actuating arms, said drum having a plurality of parallel undercut channels in its periphery extending longitudinally of the drum and parallel with the axis of alignment of said aligned cam follower lobes, a plurality of actuator elements each having a leg portion anchored in one of said channels and a head portion protruding above the periphery of the drum for engaging a selected cam follower lobe to deflect a selected switch actuating arm, each of said leg portions being formed of stiff, resilient material frictionally anchored in one of said channels in interference fit relationship, said actuators each being slidable along the respective channels into positions corresponding with different cam follower lobes for providing different switching programs, and said offset lobe surface providing a differential in operation of the corresponding switch means with respect to other switch means upon rotation of the drum.

11. A rotary drum programming apparatus comprising a rotatable drum having a plurality of parallel undercut channels in its periphery extending longitudinally of the drum, a plurality of actuators each having a head portion protruding above the periphery of the drum and a leg portion of stiff resilient material in interference fit in one of said channels, an axial shaft for rotatably supporting said drum, a frame extending parallel with said drum and having a generally U-shaped cross section with the hollow portion of said U-shaped frame facing toward the periphery of the drum and with the opposed edges of said frame forming a pair of support ledges extending parallel with the periphery of the drum, said frame having a pair of bearing brackets integrally formed thereon at opposite ends of the hollow portion of said frame for supporting said shaft, and a plurality of control members mounted upon one of said support ledges and extending into close proximity with the drum into positions for engaging the protruding heads of selected actuators upon rotation of the drum, and said actuators being slidable along their respective channels into different positions for changing to different control programs.

12. Rotary drum programming apparatus comprising a drum having a plurality of parallel undercut channels in its periphery extending longitudinally of the drum, a plurality of actuators each having a head portion protruding above the periphery of the drum and a leg portion of stiff resilient material in interference fit in one of said channels, an axial shaft for rotatably supporting said drum, a frame extending parallel with said drum and having a generally U-shaped frame facing toward the periphery of the drum and the opposed edges of said frame forming first and second support ledges extending parallel with the periphery of the drum, said frame having a pair of bearing brackets integrally formed thereon at opposite ends of the hollow portion of said frame for supporting said shaft, and a first and a second plurality of control members mounted upon said first and second support ledges, respectively, said first plurality of control members having first aligned lobes extending into close proximity with one side of the drum for engaging the protruding heads of selected actuators upon rotation of the drum, said second plurality of control members having second aligned lobes extending into close proximity with the diametrically opposite side of the drum displaced 180° from the first lobes for engaging the protruding heads of selected actuators upon rotation of the drum, and said actuators being slidable along their respective channels into different positions for changing to different control programs.

13. Rotary drum programming apparatus comprising a frame means, a drum rotatably mounted on said frame means and having a plurality of actuators protruding above the periphery of the drum, a plurality of movable control members mounted upon said frame means in spaced relationship with respect to the periphery of the drum, a plurality of movable cam followers, and selector means connected to said cam followers for controlling the operating position of said cam followers, said selector means being movable between an active and an inactive position, said selector means in its active position operatively interposing said movable cam followers between said actuators and said control members for actuating said control members, and said selector means in its inactive position removing said cam followers, whereby the drum may be turned without actuating said control members.

14. Rotary drum programming apparatus comprising frame means, a drum rotatably mounted on said frame means and having a plurality of actuators protruding above the periphery of the drum, a plurality of movable control members mounted upon said frame means in spaced relationship with respect to the periphery of the drum, a plurality of cam followers, a selector lever pivotally mounted for swinging movement about the axis of said drum, said lever being pivotally connected to said cam followers at a point spaced from said axis for controlling the operating position of said cam followers, said selector lever being swingable between an active and an inactive position, said selector lever in its active position operatively interposing said movable cam followers between said actuators and said control members for actuating said control members, and said selector lever in its inactive position removing said cam followers, whereby the drum may be turned without actuating said control members.

References Cited

UNITED STATES PATENTS

| | | | |
|---|---|---|---|
| 2,212,868 | 8/1940 | Strong | 200—27 X |
| 2,426,779 | 9/1947 | MacDonald | 74—568 |
| 2,676,235 | 4/1954 | Kennedy et al. | 200—153 X |
| 2,692,534 | 10/1954 | Pluess | 200—38 X |
| 2,742,538 | 4/1956 | Grandstaff | 200—38 X |
| 2,872,536 | 2/1959 | Honeywell | 74—568 X |
| 2,962,911 | 12/1960 | Perkey et al. | 74—568 |
| 3,072,758 | 1/1963 | Gribben et al. | 200—19 |
| 3,101,435 | 8/1963 | Welch et al. | 200—38 |
| 3,138,673 | 6/1964 | Goetz | 200—27 |
| 3,293,382 | 12/1966 | Lewandowski et al. | 200—166 X |

BERNARD A. GILHEANY, *Primary Examiner.*

H. M. FLECK, H. E. SPRINGBORN,
*Assistant Examiners.*